De L. D. CONE & P. POLDER.
Bolt and Rivet Cutters.
No. 140,405.    Patented July 1, 1873.
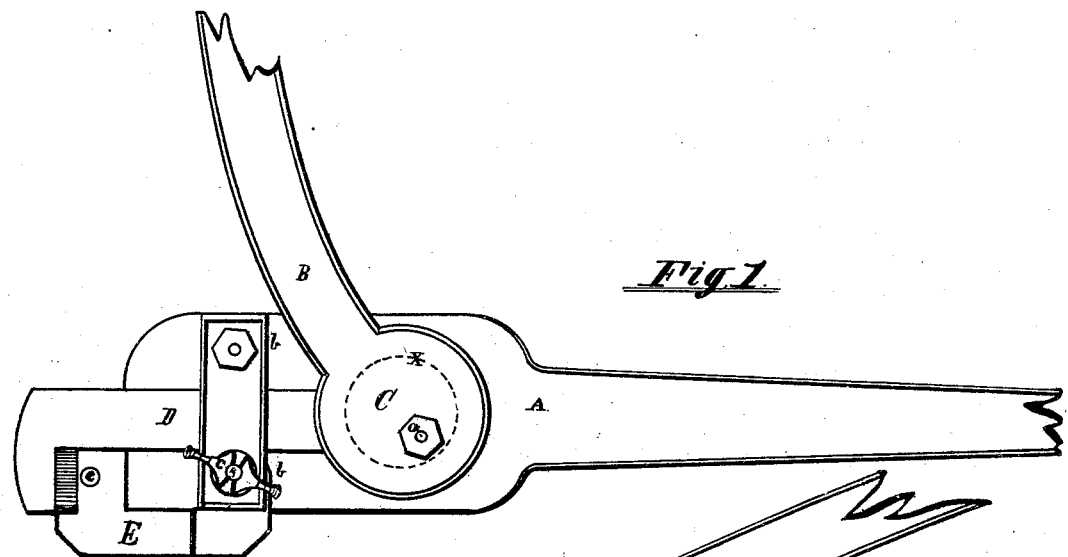
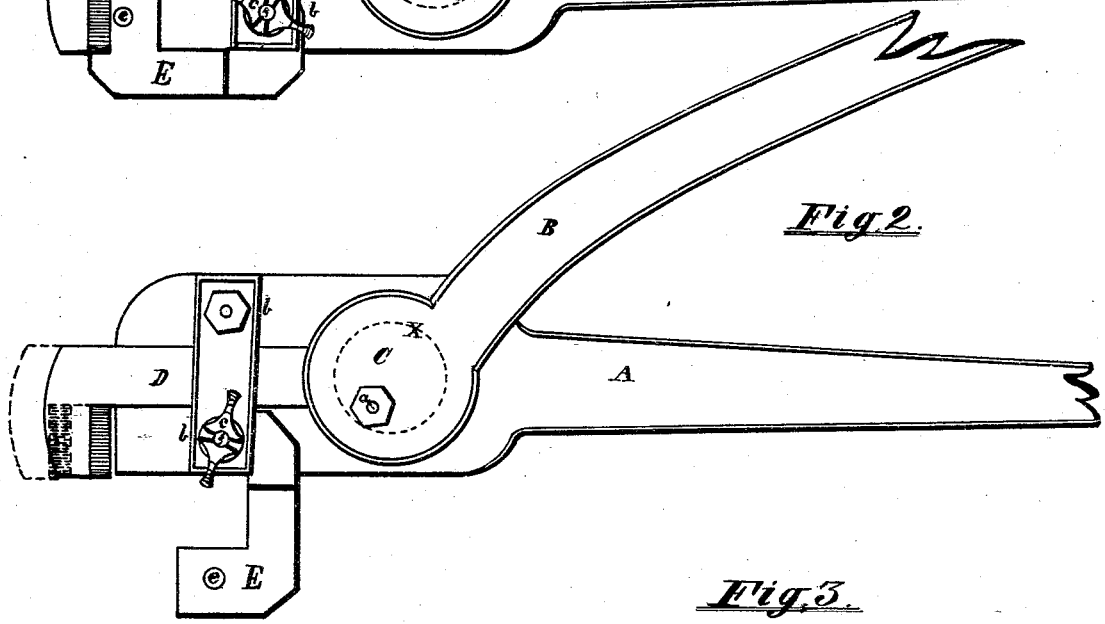
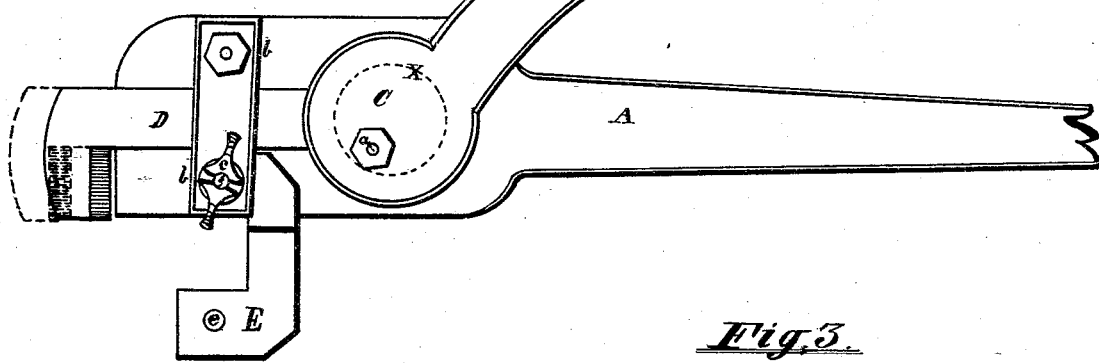
Witnesses.    Inventor.

UNITED STATES PATENT OFFICE.

DE LANCY D. CONE AND PETER POLDER, OF PANAMA, NEW YORK.

IMPROVEMENT IN BOLT AND RIVET CUTTERS.

Specification forming part of Letters Patent No. 140,405, dated July 1, 1873; application filed April 30, 1873.

*To all whom it may concern:*

Be it known that we, DE LANCY D. CONE and PETER POLDER, of Panama, in the county of Chautauqua and State of New York, have invented certain new and useful Improvements in Bolt and Rivet Trimmer; and we do hereby declare the following to be a full, clear, and exact description of the invention, such as will enable others skilled in the art to which it pertains to make and use it, reference being had to the accompanying drawings which form part of this specification.

Figure 1 is a top view of our invention with rivet-holder in position to secure and cut a rivet. Fig. 2 is a top view of the bolt-cutter with rivet device arranged at right angle with its working position. Fig. 3 is a longitudinal vertical section.

Our invention relates to an improved and useful device for cutting and trimming bolts and rivets in the manufacture of carriages.

Similar letters of reference indicate corresponding parts in the several figures of the accompanying drawing.

A is the handle to which the devices are attached and secured. B is the lever or handle with eccentric C, represented in Figs. 1 and 2 by dotted lines $x$ $x$, and in Fig. 3 is represented as constructed of one piece of metal and secured to handle A by pivot $a$. D is the chisel or cutter with slot at the lower end to fit the eccentric, and is kept in place by guides $b$ $b$. The movable rivet device E is secured at $b$, and held in place by pivot $f$ and thumb-screw $c$, and when in position for cutting or trimming rivets, or at right-angles, as shown by Fig. 2, forms one of the guides for the chisel or cutter D. At the upper end of the rivet device is a small opening, $e$, to admit and secure the rivet while being cut.

Fig. 1 is a representation of our invention in position to cut or trim a rivet. The rivet device D being moved against the head of the handle A, and secured by thumb-screw $c$, and by raising the lever or handle B the chisel or cutter D is thrown up by means of the eccentric C. By this arrangement of the lever and eccentric great power is obtained to operate the cutting-chisel.

When it is desired to cut or trim bolts the rivet device is thrown back and secured by the thumb-screw, as shown in Fig. 2, and is operated in the same manner as when cutting or trimming rivets.

By the construction of our device bolts can be cut off close to a nut and leave a smooth surface, and the power obtained is sufficient to work the same with ease.

Having thus described our invention, we claim as new and desire to secure by Letters Patent—

The rivet-holding device E attached to the bolt-cutting device, consisting of the lever B, eccentric C, and cutter D, and operating substantially as described, and for the purpose set forth.

In testimony that we claim the foregoing we have hereunto set our hands this 14th day of April, 1873.

DE LANCY D. CONE.
PETER POLDER.

Witnesses:
T. T. STERNEBORG,
J. TERHAAR.